United States Patent
Cavallaro et al.

(10) Patent No.: US 10,091,433 B1
(45) Date of Patent: Oct. 2, 2018

(54) AUTOMATED BOUNCE FLASH

(71) Applicant: Motorola Mobility LLC, Chicago, IL (US)

(72) Inventors: Alberto R. Cavallaro, Northbrook, IL (US); Cole Preston Sheldon, Chicago, IL (US); John C. Pincenti, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/604,288

(22) Filed: May 24, 2017

(51) Int. Cl.
| | |
|---|---|
| *H04N 5/235* | (2006.01) |
| *H04N 5/225* | (2006.01) |
| *G06T 7/00* | (2017.01) |
| *F21V 33/00* | (2006.01) |
| *F21V 7/00* | (2006.01) |
| *F21Y 115/10* | (2016.01) |
| *F21Y 113/13* | (2016.01) |

(52) U.S. Cl.
CPC ......... *H04N 5/2354* (2013.01); *F21V 7/0008* (2013.01); *F21V 33/0052* (2013.01); *G06T 7/0002* (2013.01); *H04N 5/2256* (2013.01); *H04N 5/2351* (2013.01); *F21Y 2113/13* (2016.08); *F21Y 2115/10* (2016.08)

(58) Field of Classification Search
CPC ... H04N 5/2354; H04N 5/2256; H04N 5/2351
See application file for complete search history.

(56) References Cited

U.S. PATENT DOCUMENTS

| | | | | | |
|---|---|---|---|---|---|
| 5,136,312 | A | * | 8/1992 | Weaver | G03B 7/16 396/175 |
| 5,194,885 | A | * | 3/1993 | Spencer | G03B 15/05 396/182 |
| 2002/0039490 | A1 | * | 4/2002 | Hagiuda | G03B 15/03 396/155 |
| 2009/0208198 | A1 | * | 8/2009 | Khuntia | G03B 15/06 396/174 |
| 2010/0284676 | A1 | * | 11/2010 | Shintani | H04N 5/2354 396/175 |
| 2013/0314565 | A1 | * | 11/2013 | Spielberg | G03B 15/05 348/224.1 |
| 2015/0156389 | A1 | * | 6/2015 | Umehara | G03B 15/05 348/242 |

(Continued)

OTHER PUBLICATIONS

Feris,"Specular Highlights Detection and Reduction with Multi-Flash Photography", J. Braz. Comp. Soc. vol. 12 No. 1 Campinas, Jun. 2006, 8 pages.

(Continued)

*Primary Examiner* — Abdelaaziz Tissire
(74) *Attorney, Agent, or Firm* — Wolfe-SBMC

(57) ABSTRACT

In implementations of automated bounce flash, a camera device includes a camera to capture an image of a subject in an environment, and includes a flash device to illuminate the subject for image capture. A memory and processor of the camera device implements an image exposure application to select a surface in the environment from which to bounce light emitted from the flash device toward the subject during the image capture. The image exposure application is also implemented to control a direction of the light emitted from the flash device onto the selected surface during the image capture.

20 Claims, 6 Drawing Sheets

(56) References Cited

U.S. PATENT DOCUMENTS

2016/0077406 A1* 3/2016 Hirasawa ............... G03B 15/05
362/5

OTHER PUBLICATIONS

Guo, "Mobile Multi-flash Photography", Proc. SPIE 9023, Digital Photography X, Mar. 7, 2014, 10 pages.
Liu, "Pose Estimation in Heavy Clutter using a Multi-Flash Camera", 2010 IEEE International Conference on Robotics and Automation (ICRA), May 2010, 8 pages.
Raskar, "Non-photorealistic Camera: Depth Edge Detection and Stylized Rendering using Multi-Flash Imaging", SIGGRAPH '04 ACM, Aug. 2004, 10 pages.
Raskar, "Computational Photography", MERL and Northwestern University, USA, May 2007, 22 pages.

* cited by examiner

AUTOMATED BOUNCE FLASH

BACKGROUND

Flash photography augments exposure in low lighting situations, but can cause glare, red-eye, and unwanted shadowing. Professional photographers often overcome these limitations by using diffusers that are separate from a camera device, and bounce light off nearby surfaces. Photographers may also use an adjustable flash that can be manually positioned so as to avoid a direct flash at a person when taking a photograph of the person. Professional photographers may also utilize multi-flash photography to minimize the negative effects of illumination. However, most people carry only a small, fixed-flash camera device or have a camera device integrated in a mobile device, such as a mobile phone or tablet device. In low lighting situations, the small, fixed-flash of a camera device simply flashes directly toward the subject when capturing a photograph of the subject, which can result in the unwanted image characteristics.

BRIEF DESCRIPTION OF THE DRAWINGS

Implementations of automated bounce flash are described with reference to the following Figures. The same numbers may be used throughout to reference like features and components shown in the Figures.

DETAILED DESCRIPTION

Implementations of automated bounce flash are described, and provide techniques to minimize or eliminate the unwanted image characteristics that can occur when using flash photography in low lighting environments. For example, a small camera device, or a camera device integrated in a mobile phone or tablet device, typically includes a small, fixed-flash. When used in low lighting situations, the small, fixed-flash of the camera device simply flashes directly toward a person when capturing a photograph of the person, which can cause glare, red-eye, and unwanted shadowing image characteristics.

In aspects of automated bounce flash, a camera device, such as any type of digital camera or mobile device that includes an integrated camera, can be used to capture a digital image of a subject in a photographic environment, and the camera device includes a flash device to illuminate the subject during image capture. Generally, as a type of computing device, the camera device implements an image exposure application that analyzes preview images to select one or more surfaces in the environment from which to bounce the light emitted from the flash device toward the subject during the image capture. The image exposure application is implemented to automatically discern the possible surfaces, such as a floor, ceiling, and/or wall, in the photographic environment for the bounce flash. The image exposure application can also control independent segments of the flash device to enable flash angles and direct the light onto the selected surfaces in the photographic environment. The features of automated bounce flash described herein simplify and automate bounce flash photography, particularly for the general user of a camera device or mobile phone in non-professional use cases.

While features and concepts of automated bounce flash can be implemented in any number of different devices, systems, environments, and/or configurations, implementations of automated bounce flash are described in the context of the following example devices, systems, and methods.

Figure 1:
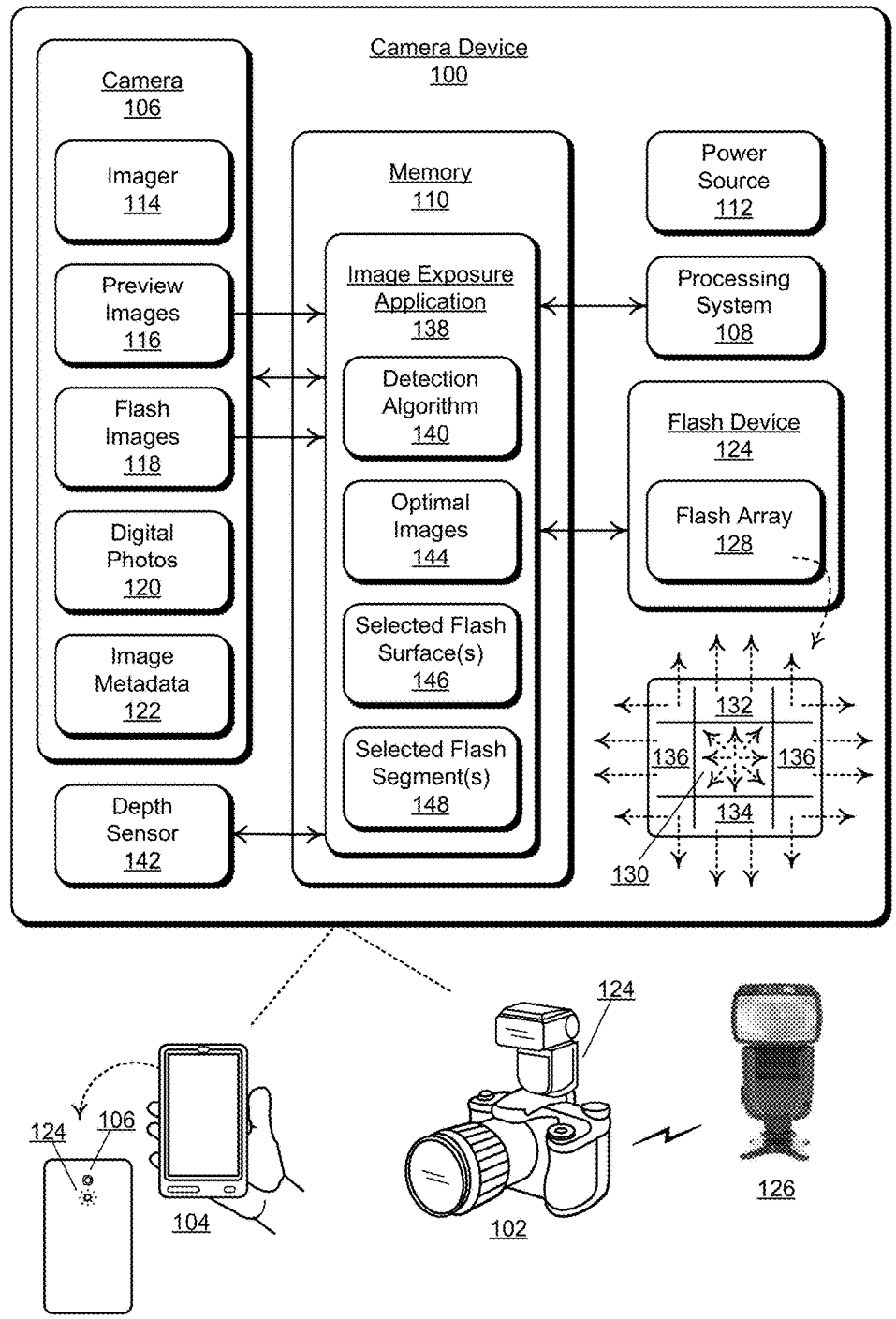
FIG. 1 illustrates an example camera device that can be used to implement techniques of automated bounce flash as described herein.

FIG. 1 illustrates an example camera device 100 that can be used to implement techniques of automated bounce flash as described herein. In this example, the camera device 100 may be any type of digital camera 102 or mobile device 104 that includes an integrated camera 106, such as a mobile phone or tablet device. Generally, the camera device 100 is an electronic and/or computing device implemented with various components, such as a processing system 108 and memory 110, as well as any number and combination of different components as further described with reference to the example device shown in FIG. 6. For example, the camera device 100 can include a power source 112 to power the device, such as a rechargeable battery and/or any other type of active or passive power source that may be implemented in an electronic and/or computing device.

The camera device 100 includes the camera 106 that is implemented with an imager 114, which activates to generate preview images 116 and to capture digital images, such as flash images 118 and digital photos 120. Generally, in terms of photography, a digital SLR (DSLR) camera can be used to generate the preview images 116 and capture digital images, which include the flash images 118 and the digital photos 120. The preview images 116 can be generated by the camera 106 when a viewfinder of the camera device 100 is activated (e.g., turned-on) and the shutter button is pressed half-way to initiate generating the preview images, generally at approximately thirty frames per second. The photographer or user of the camera device 100 can then capture a digital photo 120 by fully pressing the shutter button, and the digital photo 120 can be based on an analysis of the lighting conditions and other image characteristics detected from the preview images 116. Alternatively, the shutter button of the camera device 100 can be pressed by the photographer or user of the camera device to initiate capturing a sequence of multiple flash images 118, which are images captured using different levels of flash lighting and/or at different angles of the flash lighting.

A digital image that is captured with the camera 106 of the camera device 100 generally refers to the functions performed by the camera device 100 to image a photo when initiated by a photographer or user of the camera device to photograph a person, object, or other type of subject. In terms of digital photography, image metadata 122 of a captured image can also be recorded and stored in memory along with a captured digital image, and the image metadata 122 can include such information as a timestamp (e.g., date and time), location data corresponding to when and where an image is captured, and any other information about a digital image, such exposure and lighting characteristics.

In this example, the camera device 100 includes a flash device 124 that may be an integrated flash component of the camera device 100, or may be an external, peripheral component that either attaches to the camera device or is in wireless communication with the camera device. For example, the mobile device 104 includes the flash device 124 as an integrated flash component of the device, along with the integrated camera 106. Alternatively, the flash device 124 may be an attachable component that attaches to the digital camera 102, such as a digital SLR (DSLR) camera, or the flash device 124 may be a standalone, external flash device 126 that is implemented for wireless communication with the digital camera 102. In implementations, the camera device 100 can include different wireless radio systems, such as for Wi-Fi, Bluetooth™, or any other wireless communication system or format, which generally includes a radio device, antenna, and chipset implemented for wireless communication with other devices.

The flash device 124 has a flash array 128 of light emitters, such as light emitting diodes (LEDs) or xenon flashes, that initiate a flash of light when a photographer or user of the camera device 100 initiates taking a photo in a low-light environment. The flash device 124 can be a multi-directional, fixed-flash designed with independent segments and/or reflectors positioned to direct the light emitted from the flash device 124 in different directions and at different flash angles (e.g., relative to subject being photographed). The light emitters of the flash array 128 can be grouped into the independent segments of the flash device, and any one or combination of the independent segments can be initiated to flash during an image capture. For example, a center segment 130 of the flash array 128 emits the light from the flash device 124 toward the image subject during a camera flash; an upper segment 132 of the flash array 128 generally emits the light from the flash device 124 upwards (e.g., at a thirty degree angle); and a lower segment 134 of the flash array 128 generally emits the light from the flash device 124 downwards (e.g., at a thirty degree angle). In other implementations, the flash array 128 may also include other independent segments, such as side segments 136 of the flash array 128 that generally emit the light from the flash device 124 to the left and/or to the right of the image subject during the camera flash.

The camera device 100 includes an image exposure application 138 that can be implemented as a software application or module, such as executable software instructions (e.g., computer-executable instructions) that are executable with the processing system 108 of the device to implement features of automated bounce flash. The image exposure application 138 can be stored on computer-readable storage memory (e.g., the device memory 110), such as any suitable memory device or electronic data storage implemented in the camera device.

In aspects of automated bounce flash, a photographer can use the camera device 100 to capture an image of a subject in an environment, such as to photograph a person in a room, and the flash device 124 illuminates the subject for image capture. The image exposure application 138 is implemented to select a surface in the environment from which to bounce the light emitted from the flash device 124 toward the subject during the image capture, and the image exposure application 138 controls the direction of the light emitted from the flash device onto the selected surface during the image capture. The image exposure application 138 can determine and control which of the independent segments of the flash array 128 from which the light of the flash device 124 is emitted in the direction of the selected surface during the image capture. Examples of automated bounce flash using the camera device 100 in various environments are shown and described with reference to FIG. 2.

Figure 2:
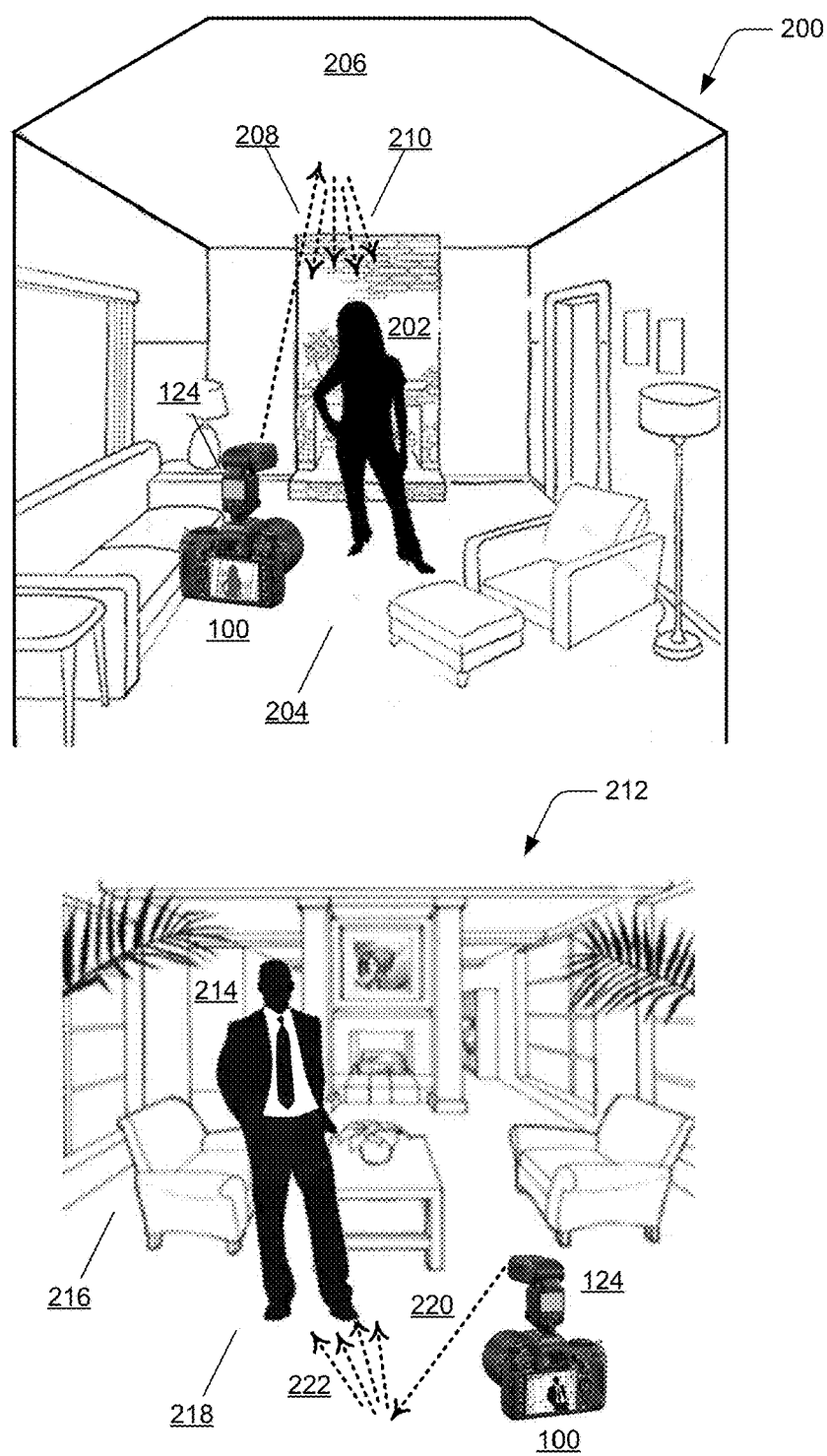
FIG. 2 illustrates examples of automated bounce flash utilizing the example camera device to implement the techniques described herein.

FIG. 2 illustrates examples of automated bounce flash utilizing the example camera device 100 to implement the techniques described herein. As shown in example 200, a person standing in a room is the subject 202 in an environment 204 who is being photographed with the camera device 100, and the flash device 124 is utilized to illuminate the subject 202 for image capture. The image exposure application 138 of the camera device 100 can select the ceiling of the room as the surface 206 from which to bounce the light 208 that is emitted from the flash device 124, and the reflected light 210 is then directed down toward the subject 202 during the image capture. The image exposure application 138 can determine use of the upper segment 132 of the flash array 128, which generally emits the light from the flash device 124 upwards (e.g., at a thirty degree angle). This reflected light 210 is diffused by virtue of being bounced off of the ceiling surface, and the diffused light can provide an improved, uniform (or approximately uniform) illumination when capturing the photograph of the person, avoiding the glare, red-eye, and unwanted shadowing image characteristics.

In a similar example 212, a person standing on an outdoor patio is the subject 214 in an environment 216 who is being photographed with the camera device 100, and the flash device 124 is utilized to illuminate the subject 214 for image capture. The image exposure application 138 of the camera device 100 can select the patio surface, which may be concrete or painted with a reflective color, as the surface 218 from which to bounce the light 220 that is emitted from the flash device 124, and the reflected light 222 is then directed up toward the subject 214 during the image capture. The image exposure application 138 can determine use of the lower segment 134 of the flash array 128, which generally emits the light from the flash device 124 downwards (e.g., at a thirty degree angle). This reflected light 222 is diffused by virtue of being bounced off the patio surface, and the diffused light can provide an improved, uniform (or approximately uniform) illumination when capturing the photograph of the person, avoiding the glare, red-eye, and unwanted shadowing image characteristics.

Although both of the automated bounce flash examples 200 and 212 are shown and described with reference to reflecting the light that is emitted from the flash device 124 from only one surface, the image exposure application 138 can determine and select more than one surface in an environment from which to bounce the flashed light and illuminate the photo subject for image capture. For example, the outdoor patio in the environment 216 may be a covered patio having a cover with a reflective surface, and based on lighting conditions, the image exposure application 138 can initiate to direct the light from the flash device 124 so as to bounce the light from the patio surface (as shown), as well as bounce the light off of the patio cover to illuminate the subject 214 during image capture with the camera device 100. Alternatively or in addition, the subject in a photographic environment may be better illuminated with a combination of direct and bounced, diffused light from the flash device 124.

In some instances, there may be a preference of available surfaces, for example if the floor surface and the ceiling surface in a room are different colors, one of the surfaces may provide a better lighting scenario over the other based on color, finish, reflectivity, and other characteristics. Further, the image exposure application 138 can be implemented to analyze the preview images 116 and/or the flash images 118 to detect a color spectrum of the photographic environment, and initiate to match the color of the light emitted from the flash device 124, such as based on which surfaces are selected for their color reflectivity and/or based on use of different color LEDs in the flash array 128.

Returning to the discussion of FIG. 1, the camera 106 of the camera device 100 can be used to generate multiple preview images 116 of an environment prior to the final image capture of a subject being photographed in the environment. The camera 106 of the camera device can also be used to capture a sequence of multiple flash images 118, such as at different flash angles utilizing the independent segments of the flash array 128 that direct the light emitted from the flash device 124 in the different directions. In aspects of automated bounce flash, the image exposure application 138 can be implemented to control and multiplex the independent segments of the flash array 128 of the flash device 124 to capture the flash images 118 at the different flash angles and/or using different levels of flash lighting.

The image exposure application 138 can include a detection algorithm 140 usable to detect features of an environment from the preview images 116 and/or from the flash images 118. For example, the detection algorithm 140 can detect the subject to be photographed in an environment, such as the person standing in the room as the subject 202 in the environment 204 who is being photographed with the camera device 100, and the person standing on the outdoor patio as the subject 214 in the environment 216 who is being photographed. In this example, the detection algorithm 140 may be also be implemented for facial recognition detection to detect the faces of the subjects being photographed, and providing a location of a subject in a photographic environment relative to the position of the camera device 100.

The detection algorithm 140 is also usable to detect the surfaces in an environment from the preview images 116 and/or from the flash images 118, such as the surfaces from which the light emitted from the flash device 124 can be directed and bounced to illuminate a subject in the environment. For example, the detection algorithm 140 can detect the approximately flat or smooth surfaces in a photograph environment, such as the ceiling surface 206 in the environment 204, and the patio surface 218 in the environment 216. Additionally, the camera device can include a depth sensor 142, such as an infra-red (IR) LED and imager, implemented to detect the depth of the surfaces in an environment relative to the camera device 100 and relative to the position of the subject to be photographed in the environment. In implementations, the depth sensor 142 may be implemented as a phase detect auto-focus (PDAF) feature of the camera device 100, and the image exposure application 138 can determine surface depth in the images from the interlaced pixels of the PDAF feature. In other implementations, the depth of a surface in an environment may be determined using multiple cameras of the camera device 100, or by using structured light features.

From the preview images 116 that are generated and/or from the flash images 118 that are captured at the different flash angles, the image exposure application 138 can determine the lighting conditions of an environment, as well as analyze the color and brightness characteristics of the environment, along with any surfaces in the environment that may be usable to bounce the light emitted from the flash device 124 toward the subject during the image capture. Additionally, using the depth sensor 142 and/or the detection algorithm 140, the image exposure application 138 can determine a position of the subject in the environment relative to the depth of a surface in the environment, and select the surface or multiple surfaces from which to bounce the light from the flash device 124 based on the depth of the surface relative to the subject in the environment.

Based on any one or more of the lighting conditions, color and brightness analysis, surfaces detection, surface texture, subject face detection, and the relative position of the surfaces to a subject in the environment, the image exposure application 138 can identify the optimal image 144 (or approximate optimal image) to capture given the photographic conditions of the environment. A determination of an optimal image (or approximate optimal image) can also take into account other characteristics of image quality, such as any one or more of image exposure, white balance, focus, signal-to-noise ratio, red-eye illumination, lighting glare, shadowing, and the like. The image exposure application 138 can then select one or more flash surfaces 146 in the environment and control selected independent flash segments 148 of the flash array 128 to control the direction of the light emitted from the flash device 124 during image capture by the camera 106 of the camera device 100 to capture the optimal image 144 (or approximately optimal image) of the subject in the environment.

In aspects of automated bounce flash, the image capture history can be maintained and used to capture subsequent photos, such as based on the photographic environment, the previously determined lighting conditions, the selected image exposure characteristics, as well as the respective positions of the subject being photographed, the camera device, and the surfaces in the environment. This information and/or analysis from a previous photo can be used to enhance or speed up the capture process for subsequent photos, particularly if the respective positions of the subject, camera device, and bounce surfaces have not changed. For example, the flash setting history can be used for multiple, subsequent photos, such as if the initial image capture is in a very dark room, the flash lighting will provide an illuminated image from which the image exposure application 138 can then analyze the photographic environment.

Example methods 300, 400, and 500 are described with reference to respective FIGS. 3-5 in accordance with one or more example implementations of automated bounce flash. Generally, any of the components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
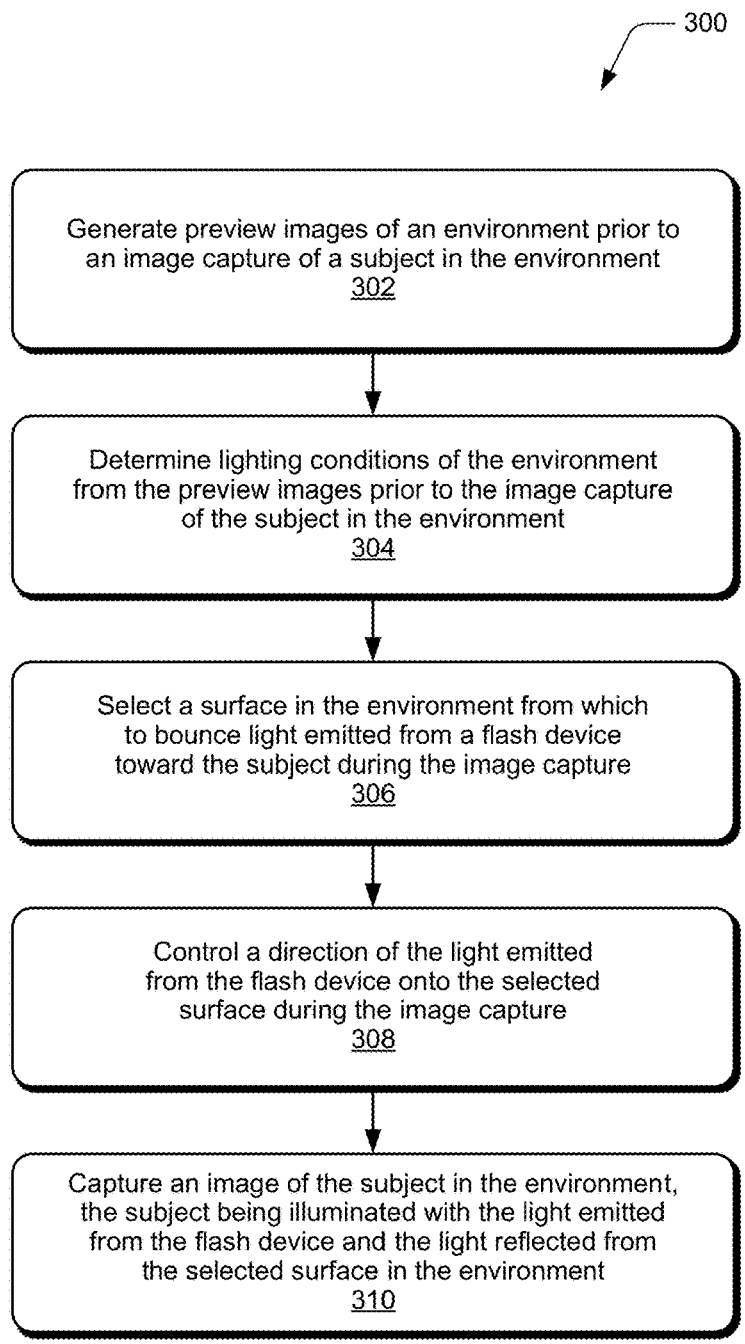
FIG. 3 illustrates an example method of automated bounce flash in accordance with one or more implementations of the techniques described herein.

FIG. 3 illustrates an example method 300 of automated bounce flash. The order in which the method is described is not intended to be construed as a limitation, and any number or combination of the described method operations can be performed in any order to perform a method, or an alternate method.

At 302, preview images of an environment are generated prior to an image capture of a subject in an environment. For example, the preview images 116 are generated by the camera 106 when a viewfinder of the camera device 100 is activated (e.g., turned-on) and the shutter button is pressed half-way to initiate generating the preview images. Other camera devices, such as integrated in the mobile device 104 (e.g., a mobile phone or tablet device), may have a selectable image preview setting that a user of the device can select to initiate generating the preview images 116.

At 304, lighting conditions of the environment are determined from the preview images prior to the image capture of the subject in the environment. For example, the image exposure application 138 implemented by the camera device 100 determines the lighting conditions in the environment 204 prior to image capture of the subject 202 with the camera device 100. The subject 202 in the environment 204 is the person standing in the room, and the person is being photographed with the camera device 100. Similarly, the image exposure application 138 determines the lighting conditions in the environment 216 prior to image capture of the subject 214 with the camera device 100. The subject 214 in the environment 216 is the person standing on the outdoor patio, and the person is being photographed with the camera device 100. In aspects of automated bounce flash, the image exposure application 138 can determine the lighting conditions in an environment prior to image capture from lighting sensors and/or from the preview images 116 that are generated with the camera 106 of the camera device 100.

At 306, a surface in the environment is selected from which to bounce light emitted from a flash device toward the subject during the image capture. For example, the image exposure application 138 implemented by the camera device 100 selects the ceiling surface 206 in the environment 204 from which to bounce the light 208 emitted from the flash device 124 toward the subject 202 as the reflected light 210 during the image capture of the subject 202 with the camera device 100. Similarly, the image exposure application 138 selects the patio surface 218 in the environment 216 from which to bounce the light 220 emitted from the flash device 124 toward the subject 214 as the reflected light 222 during the image capture of the subject 214 with the camera device 100. In aspects of automated bounce flash, the image exposure application 138 can select one or more surfaces in an environment from which to bounce the light emitted from the flash device 124, where the one or more surfaces are determined from the preview images 116 that are generated with the camera 106 of the camera device 100.

At 308, a direction of the light emitted from the flash device is controlled onto the selected surface during the image capture. For example, the image exposure application 138 controls the direction of the light 208 emitted from the flash device 124 onto the selected ceiling surface 206 during the image capture of the subject 202 in the environment 204 with the camera device 100. The image exposure application 138 can determine one or more independent flash segments 148 of the flash array 128 from which the light is emitted from the flash device 124 in the direction of the selected flash surface 146 (or selected multiple flash surfaces) during the image capture. The image exposure application 138 can direct the light 208 emitted from the flash device 124 in one or more different directions onto the respective selected flash surfaces (e.g., the selected ceiling surface 206) utilizing the independent flash segments 148 of the flash device 124. Similarly, the image exposure application 138 controls the direction of the light 220 emitted from the flash device 124 onto the selected patio surface 218 during the image capture of the subject 214 in the environment 216 with the camera device 100.

At 310, an image of the subject in the environment is captured, the subject being illuminated with the light emitted from the flash device and the light reflected from the selected surface in the environment. For example, the camera 106 of the camera device 100 captures an optimal image 144 (or an approximately optimal image) of the subject 202 in the environment 204, the subject 202 being illuminated with the light 208 emitted from the flash device 124 and the reflected light 210 from the selected ceiling surface 206 in the environment. Similarly, the camera 106 of the camera device 100 captures an optimal image 144 (or an approximately optimal image) of the subject 214 in the environment 216, the subject 214 being illuminated with the light 220 emitted from the flash device 124 and the reflected light 222 from the selected patio surface 218 in the environment.

Figure 4:
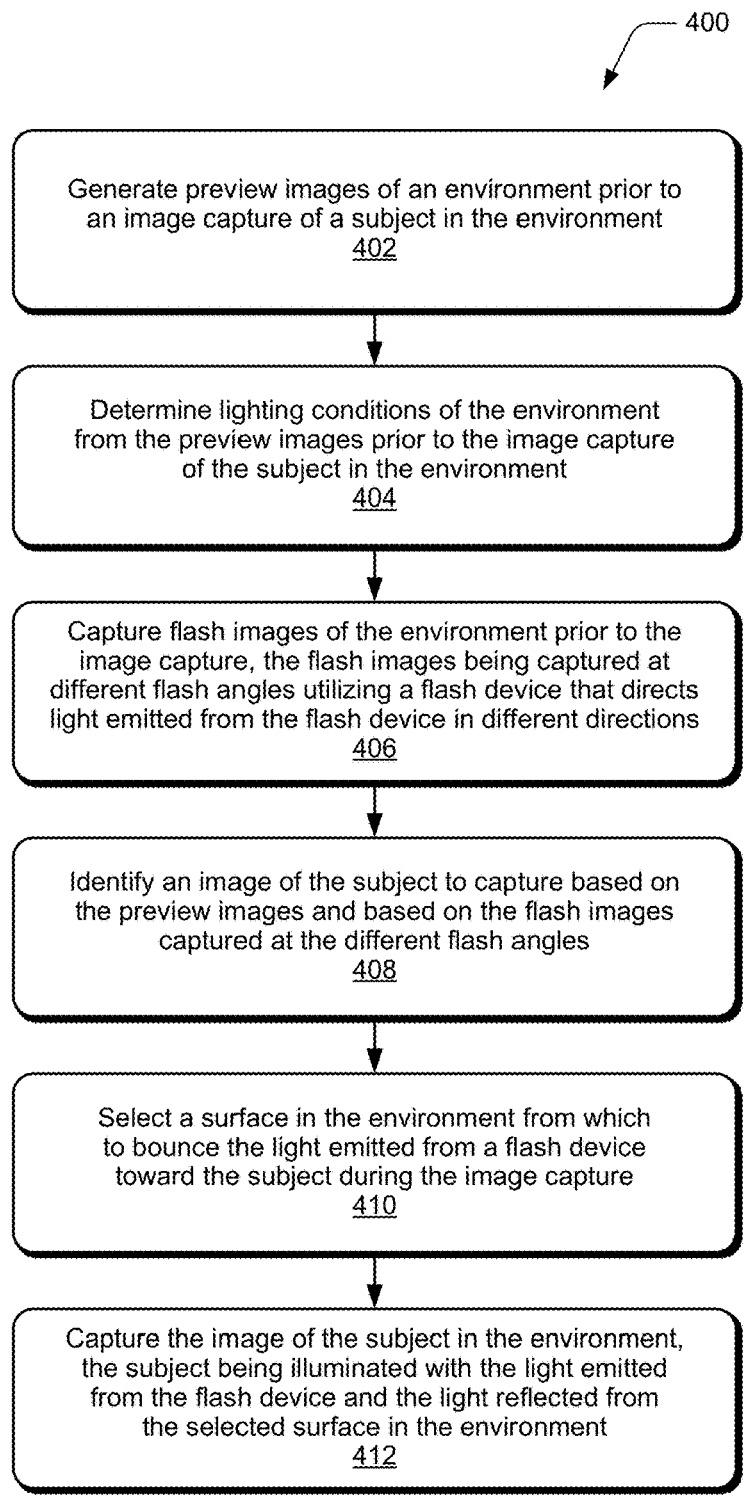
FIG. 4 illustrates an example method of automated bounce flash in accordance with one or more implementations of the techniques described herein.

FIG. 4 illustrates an example method 400 of automated bounce flash. The order in which the method is described is not intended to be construed as a limitation, and any number or combination of the described method operations can be performed in any order to perform a method, or an alternate method.

At 402, preview images of an environment are generated prior to an image capture of a subject in an environment. For example, the preview images 116 are generated by the camera 106 when a viewfinder of the camera device 100 is activated (e.g., turned-on) and the shutter button is pressed half-way to initiate generating the preview images. Other camera devices, such as integrated in the mobile device 104 (e.g., a mobile phone or tablet device), may have a selectable image preview setting that a user of the device can select to initiate generating the preview images 116.

At 404, lighting conditions of the environment are determined from the preview images prior to the image capture of the subject in the environment. For example, the image exposure application 138 implemented by the camera device 100 determines the lighting conditions in the environment 204 prior to image capture of the subject 202 with the camera device 100. The subject 202 in the environment 204 is the person standing in the room, and the person is being photographed with the camera device 100. Similarly, the image exposure application 138 determines the lighting conditions in the environment 216 prior to image capture of the subject 214 with the camera device 100. The subject 214 in the environment 216 is the person standing on the outdoor patio, and the person is being photographed with the camera device 100.

At 406, flash images of the environment are captured prior to the image capture, the flash images being captured at different flash angles utilizing a flash device that directs light emitted from the flash device in different directions. For example, the flash images 118 are captured by the camera 106 of the camera device 100 at different flash angles utilizing the independent segments flash array 128 that direct the light emitted from the flash device 124 in the different directions. In aspects of automated bounce flash, the image exposure application 138 controls and multiplexes the independent segments of the flash array 128 of the flash device 124 to capture the flash images 118 at the different flash angles and/or at different levels or intensities of flash lighting.

At 408, an image of the subject to capture is identified based on the preview images and based on the flash images captured at the different flash angles. For example, the image exposure application 138 can determine the lighting conditions of a photographic environment, as well as analyze the imaging characteristics of the environment, and identify the optimal image 144 (or approximate optimal image) to capture given the photographic conditions of the environment.

At 410, a surface in the environment is selected from which to bounce the light emitted from a flash device toward the subject during the image capture. For example, detection algorithm 140 of the image exposure application 138 is usable to detect the surfaces in an environment from the preview images 116 and/or from the flash images 118, such as the surfaces from which the light emitted from the flash device 124 can be directed and bounced to illuminate a subject in the environment. For example, the detection algorithm 140 can detect the approximately flat or smooth surfaces in a photograph environment, such as the ceiling surface 206 in the environment 204, and the patio surface 218 in the environment 216. Additionally, the depth sensor 142 of the camera device 100 detects the depth of the surfaces in an environment relative to the camera device 100 and relative to the position of the subject to be photographed in the environment. The image exposure application 138 can then select the one or more surfaces in the environment from which to bounce the light emitted from the flash device 124 based on input from the detection algorithm 140 and/or based on input from the depth sensor 142.

At 412, the image of the subject in the environment is captured, the subject being illuminated with the light emitted from the flash device and the light reflected from the selected surface in the environment. For example, the camera 106 of the camera device 100 captures an optimal image 144 (or an approximately optimal image) of the subject 202 in the environment 204, the subject 202 being illuminated with the light 208 emitted from the flash device 124 and the reflected light 210 from the selected ceiling surface 206 in the environment. Similarly, the camera 106 of the camera device 100 captures an optimal image 144 (or an approximately optimal image) of the subject 214 in the environment 216, the subject 214 being illuminated with the light 220 emitted from the flash device 124 and the reflected light 222 from the selected patio surface 218 in the environment.

Figure 5:
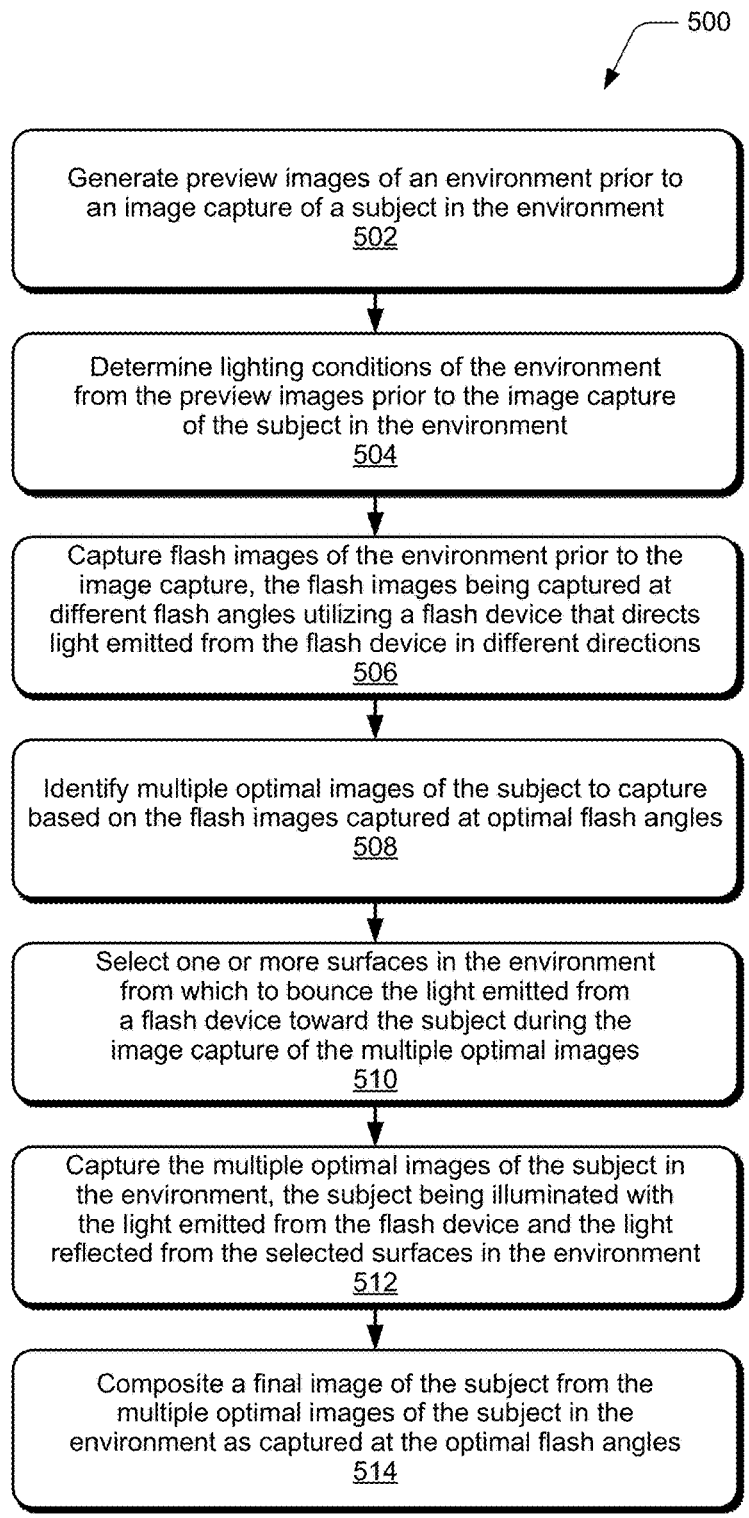
FIG. 5 illustrates an example method of automated bounce flash in accordance with one or more implementations of the techniques described herein.

FIG. 5 illustrates an example method 500 of automated bounce flash. The order in which the method is described is not intended to be construed as a limitation, and any number or combination of the described method operations can be performed in any order to perform a method, or an alternate method.

At 502, preview images of an environment are generated prior to an image capture of a subject in an environment. For example, the preview images 116 are generated by the camera 106 when a viewfinder of the camera device 100 is activated (e.g., turned-on) and the shutter button is pressed half-way to initiate generating the preview images. Other camera devices, such as integrated in the mobile device 104 or other type of mobile device, may have a selectable image preview setting that a user of the device can select to initiate generating the preview images 116.

At 504, lighting conditions of the environment are determined from the preview images prior to an image capture of the subject in the environment. For example, the image exposure application 138 implemented by the camera device 100 determines the lighting conditions in the environment 204 prior to image capture of the subject 202 with the camera device 100. Similarly, the image exposure application 138 determines the lighting conditions in the environment 216 prior to image capture of the subject 214 with the camera device 100.

At 506, flash images of the environment are captured prior to the image capture, the flash images being captured at different flash angles utilizing a flash device that directs light emitted from the flash device in different directions. For example, the flash images 118 are captured by the camera 106 of the camera device 100 at different flash angles utilizing the independent segments of the flash array 128 that direct the light emitted from the flash device 124 in the different directions. In aspects of automated bounce flash, the image exposure application 138 controls and multiplexes the independent segments of the flash array 128 of the flash device 124 to capture the flash images 118 at the different flash angles.

At 508, multiple optimal images of the subject to capture are identified based on the flash images captured at optimal flash angles. For example, the image exposure application 138 determines the lighting conditions of an environment, and based on the flash images 118 that are captured at the different flash angles, identifies multiple optimal images 144 (e.g., several of the approximate optimal images) to capture given the photographic conditions of the environment. In aspects of automated bounce flash, the optimal flash angles (or approximate optimal flash angles) can be determined based on image analysis of the flash images 118 by the image exposure application 138, where the optimal flash angles produce higher quality flash images based on appearance relative to lower quality flash images.

At 510, one or more surfaces in the environment are selected from which to bounce the light emitted from the flash device toward the subject during the image capture of the multiple optimal images. For example, the image exposure application 138 selects the one or more surfaces in the environment from which to bounce the light emitted from the flash device 124, where the one or more surfaces are determined based on input from the detection algorithm 140 as determined from the preview images 116, the flash images 118, and/or based on input from the depth sensor 142.

At 512, the multiple optimal images of the subject in the environment are captured, the subject being illuminated with the light emitted from the flash device and the light reflected from the selected surfaces in the environment. For example, the camera 106 of the camera device 100 captures the multiple optimal images 144 (or approximate optimal images) of the subject 202 in the environment 204, with the subject 202 being illuminated with the light 208 emitted from the flash device 124 and is the reflected light 210 that is bounced from the selected ceiling surface 206. Similarly, the camera 106 of the camera device 100 captures the multiple optimal images 144 (or approximate optimal images) of the subject 214 in the environment 216, with the subject 214 being illuminated with the light 220 emitted from the flash device 124 and is the reflected light 222 that is bounced from the selected patio surface 218.

At 514, a final image of the subject is composited from the multiple optimal images of the subject in the environment as captured at the optimal flash angles. For example, the image exposure application 138 composites a final image (e.g., an optimal image 144, or approximately optimal image) from the multiple optimal images of the subject in the environment as captured by the camera 106 of the camera device 100 at the optimal flash angles with the flash array 128 of the flash device 124.

Figure 6:
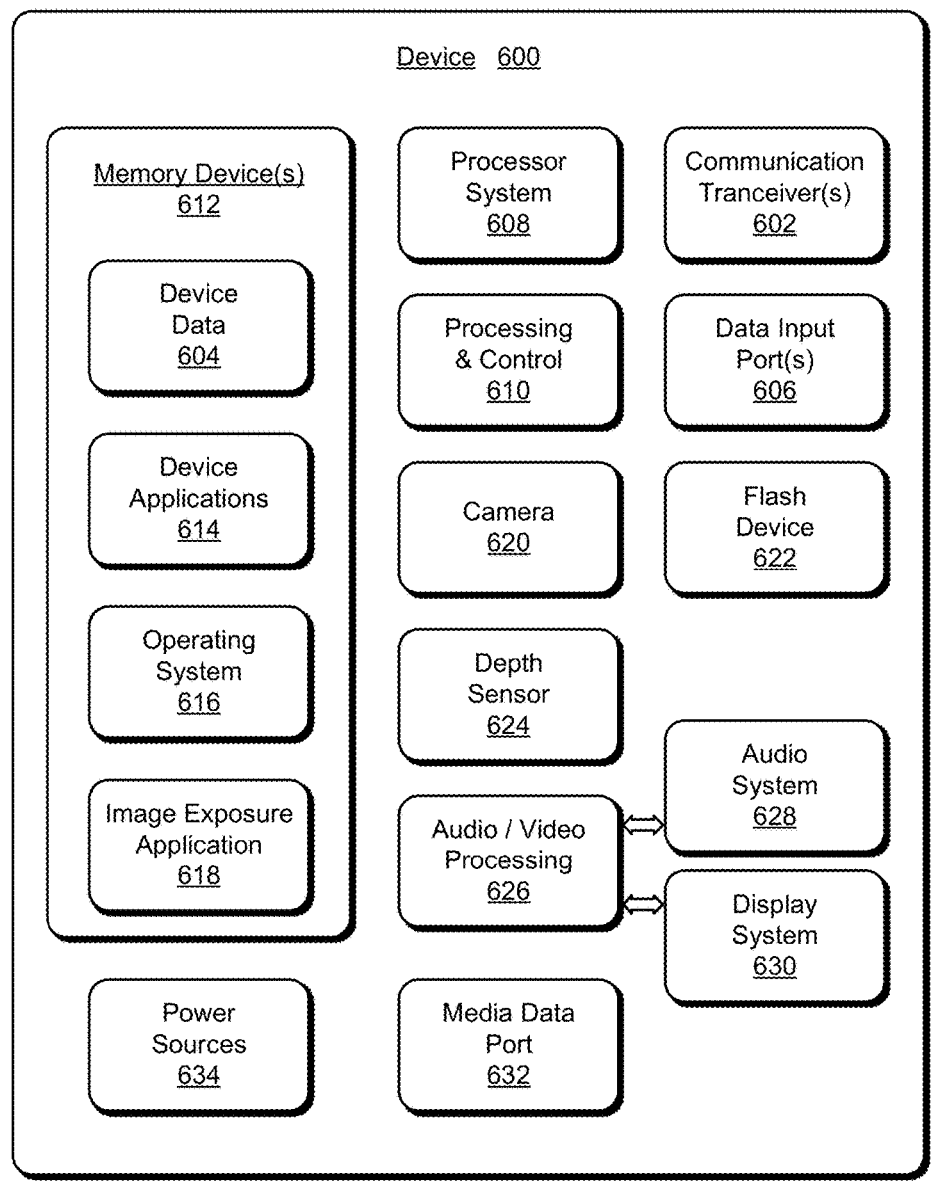
FIG. 6 illustrates various components of an example device that can implement aspects of automated bounce flash.

FIG. 6 illustrates various components of an example device 600, which can implement examples of automated bounce flash. The example device 600 can be implemented as any type of camera device, or as a mobile device that includes an integrated camera device, and in any form of an electronic and/or computing device. For example, the camera device 100 shown and described with reference to FIGS. 1-5 may be implemented as the example device 600.

The device 600 includes communication transceivers 602 that enable wired and/or wireless communication of device data 604 with other devices. The device data 604 can include any of the camera preview images, flash images, digital photos, and image metadata, as well as any of the image exposure application data that is detected and/or determined. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 600 may also include one or more data input ports 606 via which any type of data, media content, and/or inputs can be received, such as user-selectable inputs to the device, messages, music, television content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The device 600 also includes computer-readable storage memory 612 that enables data storage, such as data storage devices that can be accessed by a computing device, and that provide persistent storage of data and executable instructions (e.g., software applications, programs, algorithms, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory devices in various memory device configurations. The device 600 may also include a mass storage media device.

The computer-readable storage memory 612 provides data storage mechanisms to store the device data 604, other types of information and/or data, and various device applications 614 (e.g., software applications). For example, an operating system 616 can be maintained as software instructions with a memory device and executed by the processor system 608. The device applications may also include a device manager, such as any form of a control application, software application, signal-processing and control module, code that is native to a particular device, a hardware abstraction layer for a particular device, and so on. In this example, the device 600 includes an image exposure application 618 that implements features and aspects of automated bounce flash, and may be implemented with hardware components and/or in software, such as when the device 600 is implemented as the camera device 100 described with reference to FIGS. 1-5. The image exposure application 618 is an example of the image exposure application 138 implemented by the camera device 100 as shown and/or described with reference to FIGS. 1-5.

In this example, the device 600 includes a camera 620, a flash device 622, and a depth sensor 624, such as when the camera device 100 is implemented as the example device 600. Examples of these components include the camera 106, the flash device 124, and the depth sensor 142 of the camera device 100 as shown and/or described with reference to FIGS. 1-5. Further, although the flash device 622 is shown as an integrated component of the device 600, the flash device 622 may be implemented as an external, peripheral component of the example device.

The device 600 also includes an audio and/or video processing system 626 that generates audio data for an audio system 628 and/or generates display data for a display system 630. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 632. In implementations, the audio system and/or the display system are integrated components of the example device. Alternatively, the audio system and/or the display system are external, peripheral components to the example device.

The device 600 can also include one or more power sources 634, such as when the device is implemented as a mobile device or portable camera device. The power sources may include a charging and/or power system, and can be implemented as a flexible strip battery, a rechargeable battery, a charged super-capacitor, and/or any other type of active or passive power source.

Although implementations of automated bounce flash have been described in language specific to features and/or methods, the subject of the appended claims is not necessarily limited to the specific features or methods described. Rather, the specific features and methods are disclosed as example implementations of automated bounce flash, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A camera device, comprising: a camera to capture an image of a subject in an environment; a flash device to illuminate the subject for image capture; a memory and processor that implements an image exposure application to: select a surface in the environment from which to bounce light emitted from the flash device toward the subject during the image capture; and control a direction of the light emitted from the flash device onto the selected surface during the image capture.

Alternatively or in addition to the above described camera device, any one or combination of: the flash device is a multi-directional, fixed-flash comprising independent segments positioned to direct the light emitted from the flash device in different directions; and the image exposure application is implemented to determine one or more of the independent segments of the flash device from which the light is emitted in the direction of the selected surface during the image capture. The camera captures flash images of the environment prior to the image capture, the flash images being captured at different flash angles utilizing the independent segments of the flash device that direct the light in the different directions. The image exposure application is implemented to identify the image of the subject to capture based on image analysis of the flash images captured at the different flash angles. The independent segments of the flash device form a flash array; and the image exposure application is implemented to multiplex the flash array to capture the flash images at the different flash angles. The camera generates preview images of the environment prior to the image capture; the image exposure application is implemented to: analyze the preview images for image quality; and identify the image of the subject to capture based on the analysis of the preview images. The camera generates preview images of the environment prior to the image capture; the image exposure application is implemented to: determine lighting conditions of the environment from the preview images that include multiple surfaces in the environment usable to bounce the light emitted from the flash device toward the subject during the image capture; select at least an additional surface from the multiple surfaces in the environment from which to bounce the light emitted from the flash device toward the subject during the image capture; and control the direction of the light emitted from the flash device onto the selected surface and the at least additional surface during the image capture. A sensor to detect a depth of the surface in the environment relative to a position of the camera device; and wherein: the camera generates preview images of the environment prior to the image capture; the image exposure application is implemented to: determine a subject position of the subject in the environment relative to the depth of the surface in the environment; and select the surface from which to bounce the light based on the depth of the surface relative to the subject in the environment.

A method, comprising: generating preview images of an environment prior to an image capture of a subject in the environment; determining lighting conditions of the environment from the preview images prior to the image capture of the subject; selecting a surface in the environment from which to bounce light emitted from a flash device toward the subject during the image capture; controlling a direction of the light emitted from the flash device onto the selected surface during the image capture; and capturing an image of the subject in the environment, the subject being illuminated with the light emitted from the flash device and the light reflected from the selected surface in the environment.

Alternatively or in addition to the above described method, any one or combination of: directing the light emitted from the flash device in different directions utilizing independent segments of the flash device; and determining one or more of the independent segments of the flash device from which the light is emitted in the direction of the selected surface during the image capture. Capturing flash images of the environment prior to said capturing the image, the flash images being captured at different flash angles utilizing the independent segments of the flash device that direct the light in the different directions. Identifying the image of the subject to capture based on image analysis of the flash images captured at the different flash angles. The independent segments of the flash device form a flash array, and the method further comprising: multiplexing the flash array to capture the flash images at the different flash angles. Analyzing the preview images for image quality; and identifying the image of the subject to capture based on the image quality analysis of the preview images. Determining multiple surfaces in the environment usable to bounce the light emitted from the flash device toward the subject during the image capture; selecting at least an additional surface from the multiple surfaces in the environment from which to bounce the light emitted from the flash device toward the subject during the image capture; and controlling the direction of the light emitted from the flash device onto the selected surface and the at least additional surface during the image capture.

A method, comprising: generating preview images of an environment prior to an image capture of a subject in the environment; determining lighting conditions of the environment from the preview images prior to the image capture of the subject in the environment; capturing flash images of the environment prior to the image capture, the flash images being captured at different flash angles utilizing a flash device that directs light emitted from the flash device in different directions; identifying an image of the subject to capture based on the preview images and based on the flash images captured at the different flash angles; selecting a surface in the environment from which to bounce the light emitted from a flash device toward the subject during the image capture; and capturing the image of the subject in the environment, the subject being illuminated with the light emitted from the flash device and the light reflected from the selected surface in the environment.

Alternatively or in addition to the above described method, any one or combination of: determining optimal flash angles based on image analysis of the flash images, the optimal flash angles producing higher quality flash images based on appearance relative to lower quality flash images; and capturing additional images of the subject in the environment at the optimal flash angles utilizing the flash device that directs the light in the different directions that correspond to the optimal flash angles. Said identifying the image of the subject to capture is based on the additional images of the subject in the environment captured at the optimal flash angles. Compositing a final image of the subject from the additional images of the subject in the environment captured at the optimal flash angles. Said identifying the image of the subject to capture is based on image analysis of the generated preview images and the flash images captured at the different flash angles.

The invention claimed is:

1. A camera device, comprising:
a camera to capture an image of a subject in an environment;
a flash device to illuminate the subject for image capture;
a memory and processor that implements an image exposure application to:
   determine lighting conditions of the environment that includes multiple surfaces usable to bounce light emitted from the flash device toward the subject during the image capture;
   select a surface and at least an additional surface from the multiple surfaces in the environment from which to bounce the light emitted from the flash device toward the subject during the image capture; and
   control a direction of the light emitted from the flash device onto the selected surface and onto the at least additional surface during the image capture.

2. The camera device as recited in claim 1, wherein:
the flash device is a multi-directional, fixed-flash comprising independent segments positioned to direct the light emitted from the flash device in different directions; and
the image exposure application is implemented to determine one or more of the independent segments of the flash device from which the light is emitted in the direction of the selected surface and the at least additional surface during the image capture.

3. The camera device as recited in claim 2, wherein the camera captures flash images of the environment prior to the image capture, the flash images being captured at different flash angles utilizing the independent segments of the flash device that direct the light in the different directions.

4. The camera device as recited in claim 3, wherein the image exposure application is implemented to identify the image of the subject to capture based on image analysis of the flash images captured at the different flash angles.

5. The camera device as recited in claim 3, wherein:
the independent segments of the flash device form a flash array; and
the image exposure application is implemented to multiplex the flash array to capture the flash images at the different flash angles.

6. The camera device as recited in claim 1, wherein:
the camera generates preview images of the environment prior to the image capture;
the image exposure application is implemented to:
analyze the preview images for image quality; and
identify the image of the subject to capture based on the analysis of the preview images.

7. The camera device as recited in claim 1, wherein:
the camera generates preview images of the environment prior to the image capture; and
the image exposure application is implemented to determine the lighting conditions of the environment from the preview images.

8. The camera device as recited in claim 1, further comprising:
a sensor to detect a depth of the surface in the environment relative to a position of the camera device; and wherein:
the camera generates preview images of the environment prior to the image capture;
the image exposure application is implemented to:
determine a subject position of the subject in the environment relative to the depth of the surface in the environment; and
select the surface from which to bounce the light based on the depth of the surface relative to the subject in the environment.

9. A method, comprising:
generating preview images of an environment prior to an image capture of a subject in the environment;
determining lighting conditions of the environment from the preview images prior to the image capture of the subject;
selecting a surface and at least an additional surface in the environment from which to bounce light emitted from a flash device toward the subject during the image capture;
controlling a direction of the light emitted from the flash device onto the selected surface and onto the at least additional surface during the image capture; and
capturing an image of the subject in the environment, the subject being illuminated with the light emitted from the flash device and the light reflected from the selected surface and the at least additional surface in the environment.

10. The method as recited in claim 9, further comprising:
directing the light emitted from the flash device in different directions utilizing independent segments of the flash device; and
determining one or more of the independent segments of the flash device from which the light is emitted in the direction of the selected surface and the at least additional surface during the image capture.

11. The method as recited in claim 10, further comprising:
capturing flash images of the environment prior to said capturing the image, the flash images being captured at different flash angles utilizing the independent segments of the flash device that direct the light in the different directions.

12. The method as recited in claim 11, further comprising:
identifying the image of the subject to capture based on image analysis of the flash images captured at the different flash angles.

13. The method as recited in claim 11, wherein the independent segments of the flash device form a flash array, and the method further comprising:
multiplexing the flash array to capture the flash images at the different flash angles.

14. The method as recited in claim 9, further comprising:
analyzing the preview images for image quality; and
identifying the image of the subject to capture based on the image quality analysis of the preview images.

15. The method as recited in claim 9, further comprising:
determining multiple surfaces in the environment usable to bounce the light emitted from the flash device toward the subject during the image capture; and
selecting the surface and the at least additional surface from the multiple surfaces in the environment from which to bounce the light emitted from the flash device toward the subject during the image capture.

16. A method, comprising:
generating preview images of an environment with a camera device prior to an image capture of a subject in the environment;
determining lighting conditions of the environment from the preview images prior to the image capture of the subject in the environment;
capturing flash images of the environment prior to the image capture, the flash images being captured at different flash angles utilizing a flash device that directs light emitted from the flash device in different directions;

identifying an image of the subject to capture based on the preview images and based on the flash images captured at the different flash angles;

detecting a depth of a surface in the environment relative to a position of the camera device;

determining a subject position of the subject in the environment relative to the depth of the surface in the environment;

selecting the surface in the environment from which to bounce the light emitted from a flash device toward the subject during the image capture based on the depth of the surface relative to the subject in the environment; and capturing the image of the subject in the environment, the subject being illuminated with the light emitted from the flash device and the light reflected from the selected surface in the environment.

17. The method as recited in claim 16, further comprising:

determining optimal flash angles based on image analysis of the flash images, the optimal flash angles producing higher quality flash images based on appearance relative to lower quality flash images; and capturing additional images of the subject in the environment at the optimal flash angles utilizing the flash device that directs the light in the different directions that correspond to the optimal flash angles.

18. The method as recited in claim 17, wherein said identifying the image of the subject to capture is based on the additional images of the subject in the environment captured at the optimal flash angles.

19. The method as recited in claim 17, further comprising:

compositing a final image of the subject from the additional images of the subject in the environment captured at the optimal flash angles.

20. The method as recited in claim 16, wherein said identifying the image of the subject to capture is based on image analysis of the generated preview images and the flash images captured at the different flash angles.

* * * * *